June 17, 1958  N. N. LAREAU ET AL  2,838,984
FIRST EXPOSURE POSITIONING AND COUNTER MECHANISM
Filed Dec. 26, 1956  3 Sheets-Sheet 2

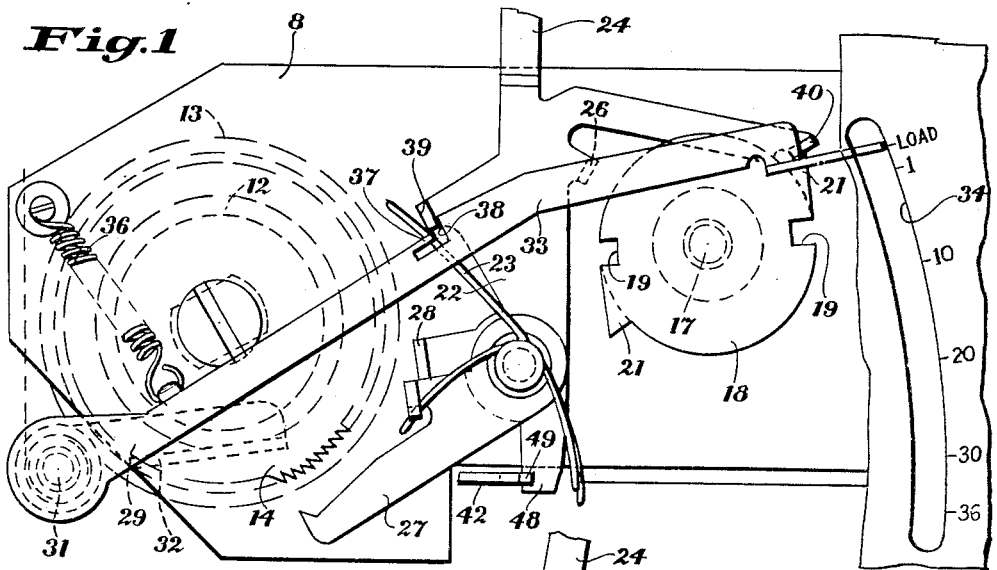
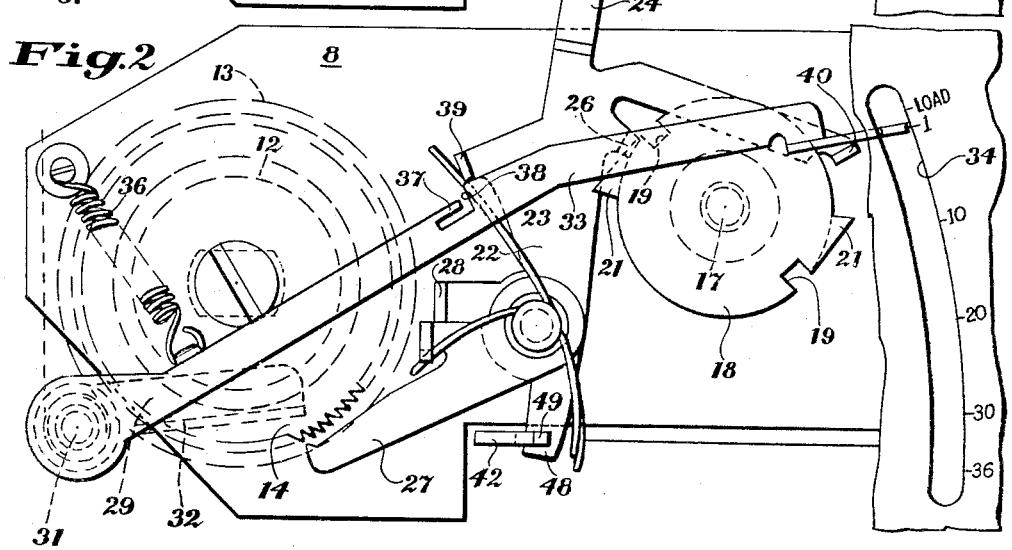

Norman N. Lareau
David E. Beach
INVENTORS

BY

ATTORNEYS

June 17, 1958   N. N. LAREAU ET AL   2,838,984
FIRST EXPOSURE POSITIONING AND COUNTER MECHANISM
Filed Dec. 26, 1956   3 Sheets-Sheet 3

Norman N. Lareau
David E. Beach
INVENTORS

BY
ATTORNEYS

United States Patent Office 2,838,984
Patented June 17, 1958

2,838,984

FIRST EXPOSURE POSITIONING AND COUNTER MECHANISM

Norman N. Lareau and David E. Beach, Rochester, N. Y., assignors to Eastman Kodak Company, Rochester, N. Y., a corporation of New Jersey Application December 26, 1956, Serial No. 630,481

12 Claims. (Cl. 95—31)

The present invention relates generally to photography and more specifically to an improved first exposure positioning and exposure counting mechanism for cameras of the roll-film type adapted to automatically lock the film-winding mechanism when the film has been advanced to a first exposure position, and to automatically indicate on a scale the number of the exposure taken.

In the construction of roll-film cameras, it is common practice to provide therein a means for indicating the number of exposures taken and separate locking means adapted to lock the film-winding mechanism when the film has been advanced to a first exposure position. The exposure-indicating and locking means utilized in the cameras in the past have been of relatively complicated construction and design containing many expensive mechanical elements such as gears, ratchets and pawls. Therefore, one of the primary objects of this invention is to provide a reliable mechanism of extremely simple design and inexpensive construction for indicating the number of exposures taken and to automatically stop the film-winding mechanism when the film has been advanced to a first exposure position.

Another object of the invention is to provide a first exposure positioning and exposure counting mechanism that may be readily incorporated in a camera by the addition of a few parts without necessitating extensive modification of the camera.

An additional object of this invention is to provide an improved automatic exposure-indicating means cooperating with a film locking mechanism for automatically locking the film-winding mechanism when the film has been advanced to a first exposure position.

Still another object of this invention is to provide means for easily and quickly adjusting the automatic exposure counter and film-locking mechanism to provide the required amount of film leader wind-off for the first exposure position.

Another object of the invention is to provide a single adjustment means for establishig the initial zero setting of the counter mechanism.

Objects and advantages other than those set forth above will be apparent from the following description when read in connection with the accompanying drawings, in which:

Fig. 1 is a plan view of a camera showing the relative positions of the exposure counter device and the film metering disk and locking mechanisms with no film wound on the take-up drum;

Fig. 2 is a view similar to Fig. 1 showing the relative positions of the structure therein after the film has been wound on the take-up drum sufficiently to cause the exposure counter device to release the film-locking mechanism;

Figure 3:
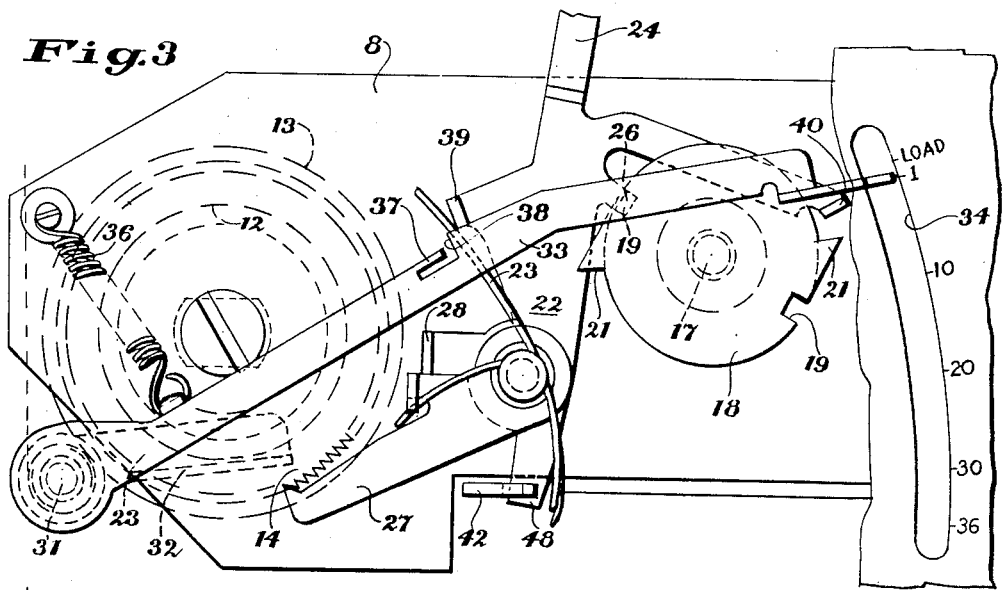
Fig. 3 is a view similar to Fig. 1 showing the film metering disk and locking mechanisms in a position locking the filmwinding mechanism with the film in a first exposure position.
Figure 4:
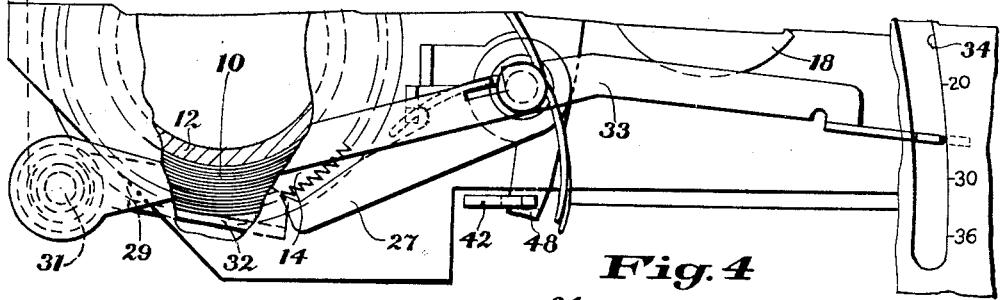
Fig. 4 is a fragmentary plan view of the camera partially in section showing the exposure counter device as the diameter of the film on the take-up drum increases.
Figure 5:
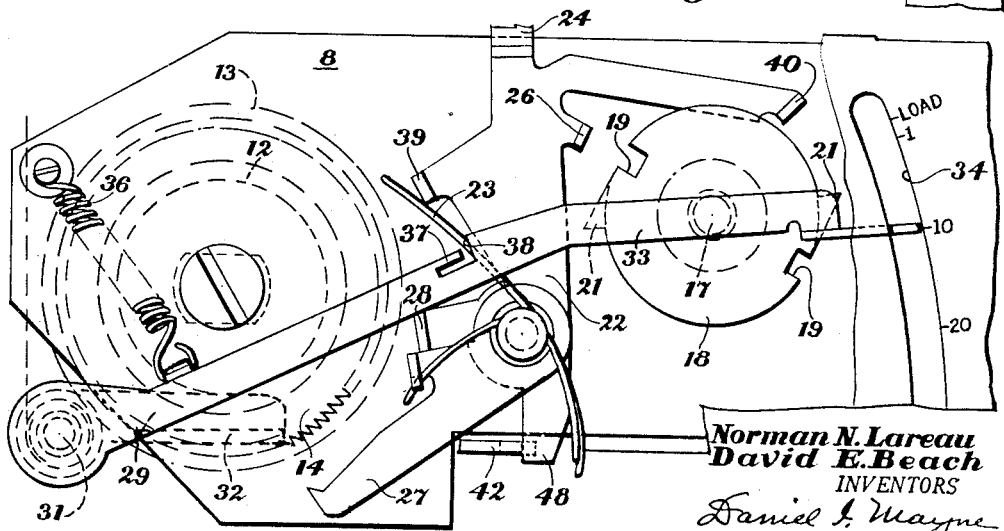
Fig. 5 is a view similar to Fig. 1 showing the position of the film metering disk and locking mechanisms immediately following actuation of the shutter to take an exposure.

In the drawings, like reference characters are used to denote like parts throughout. This invention is embodied in a roll-film camera having a body 8 forming a film cassette 9 at one end and a film take-up chamber 11 at the opposite end shown dotted in Fig. 7. A roll of film 10 which is to be exposed is held by suitable means in the film cassette 9 and the film leader is attached to a film take-up drum 12 disposed within the film take-up chamber 11.

The take-up drum 12 is provided with a turning knob 13 to provide a film winding means for winding the film 10 on the takeup drum 12. The opposite end of the take-up drum 12 is provided with a ratchet wheel 14 for a purpose to be explained hereinafter.

Figure 6:
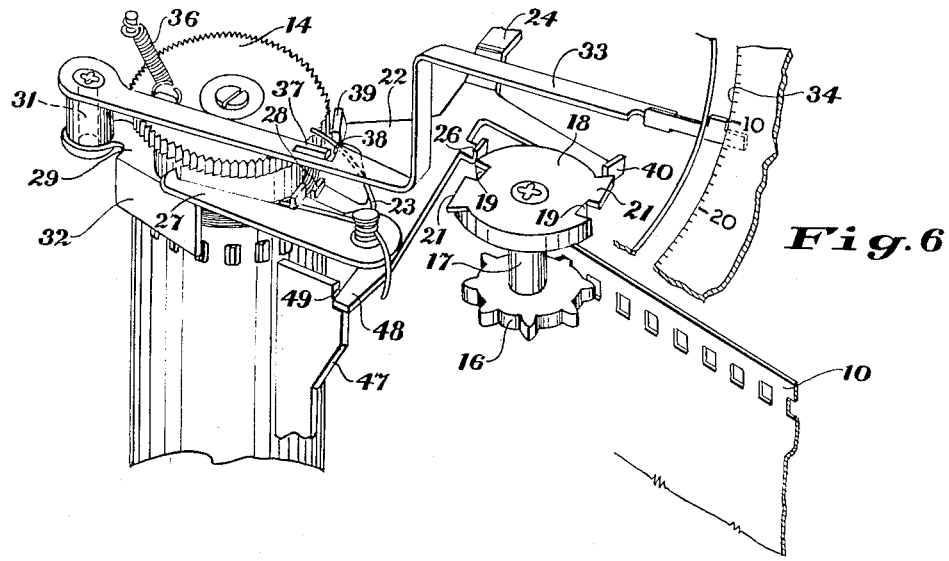
Fig. 6 is a perspective view showing the exposure counter device and the film metering disk and locking mechanisms of the present invention.

A sprocket 16 is carried by the camera body 8 on a shaft 17 disposed intermediate the film cassette 9 and the film take-up chamber 11, and is adapted to be driven by the perforations formed by the edge of the film 10 as the film is wound upon the take-up drum 12 as seen in Fig. 6. Rotation of the sprocket 16 by the moving film 10 rotates a metering disk 18 secured to the sprocket shaft 17. The metering disk 18 is provided with a peripheral notch 19 and a lip 21 for a purpose to be explained hereinafter.

A film-locking lever 22 is carried by the body 8 of the camera intermediate the ratchet wheel 14 and the metering disk 18 and is provided with a spring 23 for constantly pivotally urging the lever 22 toward the metering disk 18. The locking lever 22 is pivoted adjacent one end and is provided with a hand lever 24 at the opposite end for manually preventing the locking lever 22 from engaging the metering disk 18. Such control is desired when the film 10 is rewound from the take-up drum 12 into the film cassette 9 after all the exposures have been taken. The lever 22 also has a lug 26 adapted to ride on the metering disk 18 and engage the peripheral notch 19 to prevent further turning of the disk 18 and sprocket 16. A safety pawl 27 pivots about the same pin as the locking lever 22 and is spring-biased against a lip 28 carried by the lever 22. When the lug 26 drops into the notch 19, the metering disk 18 and sprocket 16 are prevented from turning further, and the safety pawl 27 engages the ratchet wheel 14 to effectively lock the take-up drum 12 to prevent tearing of the film perforations, and to positively stop any further movement of the film 10. The film at that moment is in a position for an exposure.

The first exposure positioning and exposure counting device includes a follower 29 connected to one end of a shaft 31 rotatably carried by the camera. The follower 29 is provided with an arm 32 adapted to ride on the take-up drum 12 and is pivotally movable about the axis of shaft 31 by the build up of film 10 on the take-up drum 12 as the film is wound thereon. An indicating member shown as a pointer 33 has one end fixed to the other end of the shaft 31, and the opposite end of the pointer 33 adapted to cooperate with a scale 34 to indicate the number of the exposure. The follower 29 and the pointer 33 are each rigidly secured to the shaft 31 in fixed angular relationship with one another so that pivotal movement of the follower 29 caused by the build-up of film 10 on the take-up drum 12 produces a corresponding pivotal movement of the pointer 33. A spring 36 is provided to pivotally urge the follower 29 against the take-up drum 12.

The pointer 33 is provided intermediate its ends with an L-shaped groove forming a tongue 37 and a shoulder 38. The shoulder 38 is adapted to engage a lug 39 formed by the locking lever 22 to hold the lever in an inoperative or disengaged position as seen in Fig. 1. The tongue 37 provides an adjustable means for varying the depth of engagement of the lug 39 with respect to the shoulder 38 thus providing a control over the leader wind off or length of film 10 wound on the take-up drum 12 in advancing the film to a first exposure position.

Figure 7:
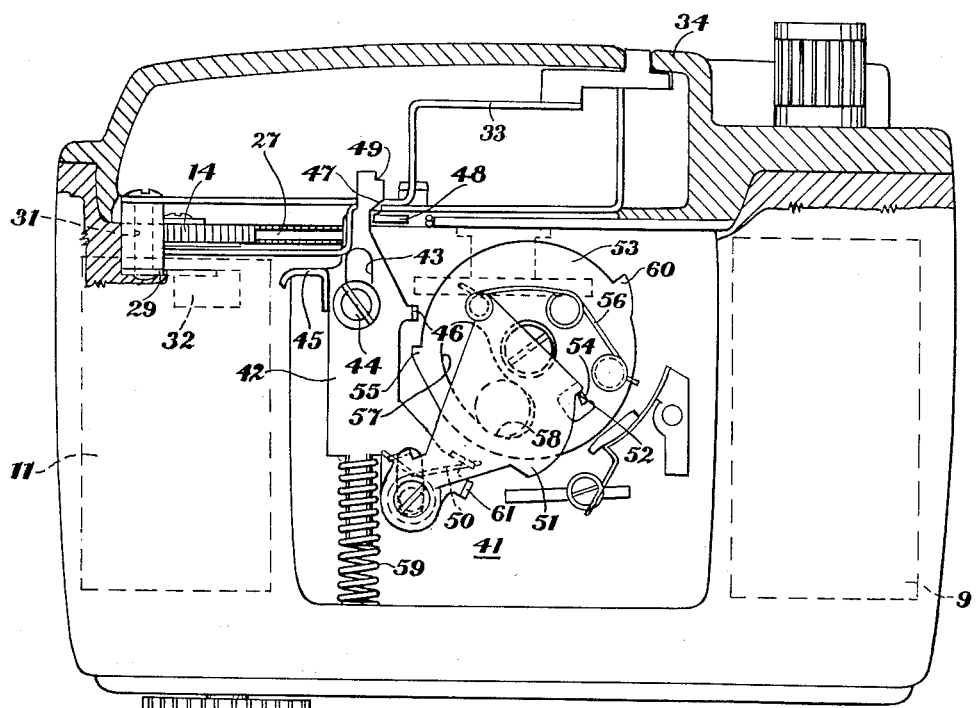
Fig. 7 is a front elevation view of a camera equipped with the exposure counter device, film metering disk and locking mechanisms of this invention, and additionally shows the shutter mechanism associated therewith.

A trigger mechanism for tripping a shutter device shown generally at 41 and disengaging the locking lever 22 from the metering disk 18 comprises a plate-like trip member 42 having an elongated slot 43 cooperating with a pin 44 to permit the member to be reciprocally moved manually by a handle 45. The trip member 42 has a lip 46 for actuating the shutter 41 and is further provided at one end with a cam 47. When the member 42 is depressed by the handle 45 to actuate the shutter 41, the initial downward movement of the member 42 tensions a spring 50 tending to turn a cover blind 51 clockwise. The cover blind is prevented from moving clockwise by a lip 52 formed by a shutter blade 53 engaging a shoulder 54 of the cover blind 51. Further downward movement of the member 42 causes the lip 46 thereon to engage a lug 55 formed by the shutter blade 53 and to turn the blade counterclockwise moving the lip 52 out of engagement with the shoulder 54. The spring 50 immediately turns the cover blind 51 clockwise thereby tensioning and releasing a hair pin spring 56 causing the shutter blade 53 to turn counterclockwise. As the shutter blade turns counterclockwise, a slot 57 included therein passes over an exposure aperture 58 shown dotted in Fig. 7 thus making an exposure. In addition to actuating the shutter 41, depression of the member 42 causes the cam 47 to engage a finger 48 formed by the locking lever 22 to pivotally urge the lever against the bias of the spring 23 to disengage the lug 26 from the notch 19. The cam 47 is provided with a recess 49 within which the finger 48 seats locking the trip member 42 in a depressed position and maintaining the locking lever 22 in a disengaged position. Continued winding of the film 10 by means of the winding knob 13 causes the sprocket 16 and metering disk 18 to be turned until the lip 21 engages a lug 40 formed by the locking lever 22 to urge the lever pivotally causing the finger 48 to be withdrawn from the recess 49, releasing the trip member 42 and permitting the locking lever 22 to be urged toward the metering disk 18 with the lug 26 engaging the periphery of the disk and riding thereon. Release of the member 42 causes a spring 59 which was compressed upon downward movement of the member 42 to urge the member 42 upwardly causing the lip 46 to engage an ear 60 on the shutter blade 53 to move the shutter blade clockwise, and simultaneously causing a lug 61 to move the cover blind 51 counterclockwise. This movement in turn tensions and releases the hair pin spring 56 moving the shutter blade 53 and cover blind 51 into the position as shown in Fig. 7 in preparation for another exposure.

In the operation of this invention, the locking lever 22 is manually moved initially to the left by the handle 24 to dispose the lug 39 behind the shoulder 38 and in engagement therewith. The pointer 33 in this position points to a marker on the scale 34 reading "Load." A roll of film 10 is placed in the film cassette 9 and the leader attached to the take-up drum 12 which is turned by the winding knob 13. The perforations along the edge of the film 10 are engaged by the sprocket 16 whereupon continued winding of the film 10 causes a corresponding movement of the sprocket 16. As the winding knob 13 is turned to wind the film 10 on the take-up drum 12, the film build-up on the drum causes the follower 29 to be moved pivotally against the bias of the spring 36.

The pivotal movement of the follower 29 causes a corresponding movement of the pointer 33 and as the shoulder 38 clears the lug 39, the locking lever 22 is pivotally urged by the spring 23 toward the metering disk 18 with the lug 26 engaging and riding the periphery of the disk 18. Upon continued movement of the winding knob 13, the disk 18 is rotated, until the notch 19 registers with the lug 26 which drops therein. This effectively locks the metering disk 18 and sprocket 16 and causes the safety pawl 27 to engage the ratchet wheel 14 to lock the take-up drum with the film 10 disposed in the first exposure position as indicated on the scale 34 by the pointer 33. The handle 45 is depressed to actuate the shutter 41 and cam the locking lever 22 forcing the lug 26 out of engagement with the notch 19 and the safety pawl 27 out of engagement with the ratchet wheel 14. The finger 48 engages the recess 49 of the trip member 42 to hold the locking lever 22 in a disengaged position. Upon continued turning of the winding knob 13 to wind the exposed portion of the film strip on the take-up drum 12 and to prepare the camera for a second exposure position, the sprocket 16 and metering disk 18 are rotated causing the lip 21 to engage the lug 40 of the locking lever 22 to pivotally move the lever against the bias of the spring 23. This movement causes the finger 48 to be withdrawn from the recess 49 of the trip member 42 releasing the member 42 and the locking lever 22 which is urged by the spring 23 toward the metering disk 18 with the lug 26 engaging the periphery of the disk 18 once again. The lug 26 upon further rotation of the disk 18 bottoms in the notch 19 to lock the sprocket 16 and film take-up drum 12 in the next or second exposure position as indicated on the scale 34 by the pointer 33. In this camera, the sprocket 16 is provided with a specified number of teeth so that one-half revolution of the sprocket advances the film 10 to the next successive exposure position. Consequently, the disk 18 is provided with two diametrically opposed notches 19. Thus rotating the sprocket and disk 18 one-half revolution advances the film 10 to the next exposure position. After the completion of all the exposures, the handle 24 is manually moved against the bias of the spring 23 to hold the locking lever 22 in a disengaged position and the exposed film 10 rewound into the film cassette 9. As the film 10 is rewound, the follower 29 and pointer 33 are automatically returned to the "load" position by means of the spring 36.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In a roll-film camera having a supply roll and a take-up drum, the combination of: film winding means for moving a film from said supply roll to said take-up drum; locking means cooperating with said film winding means to selectively lock said film winding means in successive film exposure positions; means for withholding said locking means from said film winding means as said film is wound on said take-up drum; and a follower associated with said last named means and being responsive to the build up of film on said take-up drum to actuate said last named means whereby said locking means is released to lock said film winding means when said film has been advanced to a first exposure position.

2. In a roll-film camera having a supply roll and a take-up drum, the combination of: film winding means for moving a film from said supply roll to said take-up drum; locking means cooperating with said film winding means to selectively lock said film winding means in successive film exposure positions; a follower adapted to ride on said take-up drum and movable by the build up of film thereon; a member connected to said follower and adapted to be movable therewith; and means carried by said member cooperating with said locking means to withhold said locking means from said film winding means as said film is wound on said take-up drum and to automatically release said locking means to lock said film winding means when said film has been advanced to a first exposure position.

3. In a roll-film camera having a supply roll and a take-up drum, the combination of: film winding means for moving a film from said supply roll to said take-up drum; locking means cooperating with said film winding means to selectively lock said film winding means in successive film exposure positions; a follower pivotally mounted on said camera about one end and having its opposite end adapted to ride on said take-up drum, said follower adapted to be pivotally movable by the build up of film on said take-up drum; a member having one end connected to said follower and adapted to be pivotally movable therewith; and means carried by said member cooperating with said locking means to withhold said locking means from said film winding means as said film is wound on said take-up drum, and to automatically release said locking means to lock said film winding means when said film has been advanced to a first exposure position.

4. In a roll-film camera having a supply roll and a take-up drum, the combination of: film winding means for moving a film from said supply roll to said take-up drum; locking means cooperating with said film winding means to selectively lock said film winding means in successive film exposure positions, said locking means having a lug; a follower pivotally mounted on said camera about one end and having its opposite end adapted to ride on said take-up drum, said follower adapted to be pivotally movable by the build up of film on said take-up drum; a member having one end connected to said follower and adapted to be pivotally movable therewith; and a shoulder formed by said member adapted to engage said lug to withhold said locking means from said film winding means as said film is wound on said take-up drum, and to automatically release said lug and said locking means to lock said film winding means when said film has been advanced to a first exposure position.

5. In a roll film camera having a supply roll and a take-up drum, the combination of: film winding means for moving a film from said supply roll to said take-up drum; locking means cooperating with said film winding means to selectively lock said film winding means in successive film exposure positions, said locking means having a lug; a follower pivotally mounted on said camera about one end and having its opposite end adapted to ride on said take-up drum, said follower adapted to be pivotally movable by the build up of film on said take-up drum; a member having one end connected to said follower and adapted to be pivotally movable therewith; a shoulder formed by said member adapted to engage said lug to withhold said locking means from said film winding means as said film is wound on said take-up drum and to automatically release said lug and said locking means when a predetermined length of film has been wound on said take-up drum to lock said film winding means with said film in a first exposure position; and adjusting means carried by said member for varying said predetermined length of film required to be wound on said take-up drum to cause said shoulder to release said lug.

6. In a roll film camera having a supply roll and a take-up drum, the combination of: film winding means for moving a film from said supply roll to said take-up drum; locking means cooperating with said film winding means to selectively lock said film winding means in successive film exposure positions, said locking means having a lug; a follower pivotally mounted on said camera about one end and having its opposite end adapted to ride on said take-up drum, said follower adapted to be pivotally movable by the build up of film on said take-up drum; a member having one end connected to said follower and adapted to be pivotally movable therewith; a shoulder formed by said member adapted to engage said lug to withhold said locking means from said film winding means as said film is wound on said take-up drum and to automatically release said locking means when a predetermined length of film has been wound on said take-up drum to lock said film winding means with said film in a first exposure position; and a tongue carried by said member adjacent said shoulder to form a seat for said lug, said tongue adapted to be movable for varying the depth of engagement of said lug and said shoulder to vary said predetermined length of film required to be wound on said take-up drum to cause said shoulder to release said lug.

7. In a roll-film camera having a supply roll and a take-up drum, the combination of: film winding means for moving a film from said supply roll to said take-up drum; locking means cooperating with said film winding means to selectively lock said film winding means in successive film exposure positions; a scale carried by said camera for indicating the number of film exposures taken; means for withholding said locking means from said film winding means as said film is wound on said take-up drum; and a follower associated with said last named means and being responsive to the build up of film on said take-up drum to actuate said last named means whereby said locking means is released to lock said film winding means when said film has been advanced to a first exposure position, said last named means further cooperating with said scale to indicate the number of the exposure taken.

8. In a roll-film camera having a supply roll and a take-up drum, the combination of: film winding means for moving a film from said supply roll to said take-up drum; locking means cooperating with said film winding means to selectively lock said film winding means in successive film exposure positions; a scale carried by said camera for indicating the number of film exposures taken; a follower adapted to ride on said take-up drum; a pointer connected to said follower and actuable by the build up of film on said take-up drum to indicate on said scale the number of the exposure taken; and means carried by said pointer cooperating with said locking means to withhold said locking means from said film winding means as said film is wound on said take-up drum and to automatically release said locking means to lock said film winding means when said film has been advanced to a first exposure position.

9. In a roll-film camera having a supply roll and a take-up drum, the combination of: film winding means for moving a film from said supply roll to said take-up drum; locking means cooperating with said film winding means to selectively lock said film winding means in successive film exposure positions; a scale carried by said camera for indicating the number of film exposures taken; a follower pivotally mounted on said camera about one end and having its opposite end adapted to ride on said take-up drum; a pointer having one end connected to said follower and adapted to be pivotally moved therewith by the build up of film on said take-up drum causing the opposite end of said pointer to indicate the number of the exposure taken on said scale; and means carried by said pointer cooperating with said locking means to withhold said locking means from said film winding means as said film is wound on said take-up drum and to automatically release said locking means to lock said film winding means when said film has been advanced to a first exposure position.

10. In a roll-film camera having a supply roll and a take-up drum, the combination of: film winding means for moving a film from said supply roll to said take-up drum; locking means cooperating with said film winding means to selectively lock said film winding means in successive film exposure positions, said locking means forming a lug; a scale carried by said camera for indicating the number of film exposures taken; a follower pivotally mounted on said camera about one end and having its other end adapted to ride on said take-up drum; a pointer having one end connected to said follower and adapted to be pivotally moved therewith by the build up of film on said take-up drum causing the opposite end of said pointer to indicate the number of the exposure taken on said scale; and a shoulder formed by said pointer adapted to engage said lug to withhold said locking means from said film winding means as said film is wound on said take-up drum and to automatically release said lug and said locking means to lock said film winding means when said film has been advanced to a first exposure position.

11. In a roll-film camera having a supply roll and a take-up drum, the combination of: film winding means for moving a film from said supply roll to said take-up drum; locking means cooperating with said film winding means to selectively lock said film winding means in successive film exposure positions, said locking means forming a lug; a scale carried by said camera for indicating the number of film exposures taken; a follower pivotally mounted on said camera about one end and having its other end adapted to ride on said take-up drum; a pointer having one end connected to said follower and adapted to be pivotally moved therewith by the build up of film on said take-up drum causing the opposite end of said pointer to indicate the number of the exposure taken on said scale; a shoulder formed by said pointer adapted to engage said lug to withhold said locking means from said film winding means as said film is wound on said take-up drum and to automatically release said lug and said locking means when a predetermined length of film has been wound on said take-up drum to lock said film winding means with said film in a first exposure position; and adjusting means carried by said pointer for varying said predetermined length of film required to be wound on said take-up drum to cause said shoulder to release said lug.

12. In a roll-film camera having a supply roll and a take-up drum, the combination of: film winding means for moving a film from said supply roll to said take-up drum; locking means cooperating with said film winding means to selectively lock said film winding means in successive film exposure positions, said locking means forming a lug; a scale carried by said camera for indicating the number of film exposures taken; a follower pivotally mounted on said camera about one end and having its other end adapted to ride on said take-up drum; a pointer having one end connected to said follower and adapted to be pivotally moved therewith by the build up of film on said take-up drum causing the opposite end of said pointer to indicate the number of the exposure taken on said scale; a shoulder formed by said pointer adapted to engage said lug to withhold said locking means from said film winding means as said film is wound on said take-up drum and to automatically release said locking means when a predetermined length of film has been wound on said take-up drum to lock said film winding means with said film in a first exposure position; and a tongue carried by said pointer adjacent said shoulder to form a seat for said lug, said tongue adapted to be movable for varying the depth of engagement of said lug and said shoulder to vary said predetermined length of film required to be wound on said take-up drum to cause said shoulder to release said lug.

References Cited in the file of this patent
UNITED STATES PATENTS 2,309,382     Cazin _____ Jan. 26, 1943